United States Patent
Harold et al.

(10) Patent No.: US 7,700,184 B2
(45) Date of Patent: Apr. 20, 2010

(54) PD NANOPORE AND PALLADIUM ENCAPSULATED MEMBRANES

(75) Inventors: Michael P. Harold, Houston, TX (US); Balamurali Krishna R. Nair, Houston, TX (US)

(73) Assignee: University of Houston System, Houston, TX (US)

( * ) Notice: Subject to any disclaimer, the term of this patent is extended or adjusted under 35 U.S.C. 154(b) by 405 days.

(21) Appl. No.: 11/838,766

(22) Filed: Aug. 14, 2007

(65) Prior Publication Data

US 2008/0176060 A1 Jul. 24, 2008

Related U.S. Application Data

(60) Provisional application No. 60/822,316, filed on Aug. 14, 2006.

(51) Int. Cl.
- *B32B 3/26* (2006.01)
- *B05D 7/22* (2006.01)
- *B05D 1/18* (2006.01)

(52) U.S. Cl. ............ 428/316.6; 428/318.4; 428/319.1; 428/336; 428/209; 428/210; 428/457; 428/469; 428/689; 428/701; 428/702; 427/230; 427/531; 427/243

(58) Field of Classification Search ............ 428/316.6, 428/318.4, 319.1, 336, 209, 210, 457, 469, 428/689, 701, 702; 427/230, 531, 243
See application file for complete search history.

(56) References Cited

U.S. PATENT DOCUMENTS

| | | |
|---|---|---|
| 3,350,845 A | 11/1967 | McKinley |
| 3,439,474 A | 4/1969 | McKinley |
| 3,881,891 A | 5/1975 | Goltsov et al. |
| 5,149,420 A | 9/1992 | Buxbaum et al. |
| 5,451,386 A | 9/1995 | Collins et al. |
| 5,652,020 A | 7/1997 | Collins et al. |
| 6,103,028 A | 8/2000 | Juda et al. |
| 6,152,995 A | 11/2000 | Edlund |
| 6,761,929 B2 | 7/2004 | Damle |

*Primary Examiner*—Ling Xu
(74) *Attorney, Agent, or Firm*—Conley Rose, P.C.

(57) ABSTRACT

Novel catalytic membranes and methods of synthesizing the membranes are disclosed herein. The technology involves the synthesis of a new type of permselective membrane that combines a hollow porous support with strategically positioned catalytic and selective transport functions to overcome thermodynamic, kinetic, and thermal obstacles, such as in the production of hydrogen. Sub-micron, dense metallic catalysts and films may be deposited within porous hollow substrates to create the membranes using the techniques of sol slip casting, film coating and electroless plating.

32 Claims, 15 Drawing Sheets

PI - PRESSURE INDICATOR; PRV - PRESSURE REDUCING VALVE; TC - TEMPERATURE CONTROLLER; BFM - BUBBLE FLOW METER; MFC MASS FLOW CONTROLLER; TI - TEMPERATURE INDICATOR; MX - MIXER; BPR - BACK PRESSURE REGULATOR; GC - GAS CHROMATOGRAPH

PD NANOPORE AND PALLADIUM ENCAPSULATED MEMBRANES

CROSS-REFERENCE TO RELATED APPLICATIONS

The present application claims the benefit of U.S. Provisional Application Ser. No. 60/822,316, filed Aug. 14, 2006, herein incorporated by reference in its entirety for all purposes.

BACKGROUND

1. Field of the Invention

This invention relates to a method for synthesizing metallic films and nanopores on porous substrates. More specifically, the invention relates to palladium (Pd) based alloys on ceramic supports to create inorganic membranes containing nanopores, and the use of the membranes.

2. Background of the Invention

The production of hydrogen is widely practiced in large scale processes comprising steam reforming, water gas shift, $CO_2$ removal, methanation and/or pressure-swing adsorption, giving a gas that is >95% hydrogen. However, the large-scale process is not economically feasible for distributed production of hydrogen needed for supplying proton exchange membrane fuel cells (PEMFC). Notable requirements include a compact device, rapid startup and turn up/turndown (<30 seconds startup time), and CO-free hydrogen feed (<1 ppm CO).

Distributed fuel processing technology involves the multi-step sequence of (1) auto-thermal-steam reforming (ATR); (2) water-gas-shift (WGS); and (3) preferential oxidation (PROX). The reforming step produces the hydrogen while the latter steps convert fuel cell poison carbon monoxide (CO) to carbon dioxide ($CO_2$). In recent studies, methanol auto-thermal reforming and partial oxidation on Pd and Cu catalysts have demonstrated high productivities; but exit CO concentrations are 1-2%, so the additional step requiring a PROX reactor is not eliminated. The multi-step process is complex, requiring a wide range of conditions and prolonged startup times that do not meet the current demands previously detailed.

Because the conventional chemical process for the production of hydrogen involves a sequence of reaction, separation, and purification steps, these inorganic membranes appear to be a natural application for the production of hydrogen. Inorganic membrane reactors are a sub-class of multi-functional reactors that couple reaction and separation in a single unit to achieve higher conversion or desired product yield with reduced volume and/or energy consumption. These membranous reactors exist in two conformations: unsupported foils, comprised of thick layers of Pd and Pd alloys, or as supported thin films comprised of Pd or Pd alloys deposited on porous or dense support structures.

Recent studies have examined the use of Pd-based membrane reactors to generate a high purity hydrogen stream in a single unit, while resisting poisoning. Pd has a unique combination of high hydrogen permselectivity and flux, and it can withstand high temperatures. Furthermore, research indicates certain Pd alloys are resistant to sulfur hydroxide ($H_2S$) poisoning that is resultant from hydrocarbon production of synthesis gas. Due to successes with the advantageous properties of these materials, the scientific and commercial communities actively pursued increased research and development opportunities. More recently, research has focused on improving the efficiency of the membranes. Efficiency is the compromise between flux, and permselectivity. Consequently, there exists a significant technical base, and there are a number of patented Pd and Pd alloy processes for producing membranous devices and methods of utilization.

These successes notwithstanding, the deployment of membranes has been deterred by several hurdles: (i) limited performance improvements, (ii) high materials cost, and (iii) unproven reliability. Previous studies involving permselective membrane reactors have involved selective removal of a reaction product to increase the overall conversion. In most cases the conversion gains in these cases have not warranted commercial development. The cost of permselective membranes, notably those that are Pd-based, can be prohibitive unless ultrathin films can be synthesized. Even if thickness reductions are realized, reliability can remain an issue as sub-micron Pd membranes suffer a loss in hydrogen permselectivity through defect formation when subjected to thermal swings.

Consequently, there is a need for a high flux, highly permselective, highly durable membrane with ultra thin Pd and Pd alloy incorporation.

BRIEF SUMMARY

Novel catalytic membranes and methods of synthesizing the membranes are disclosed herein. The technology involves the synthesis of a new type of permselective membrane that combines a hollow porous support with strategically positioned catalytic and selective transport functions to overcome thermodynamic, kinetic, and thermal obstacles, such as in the production of hydrogen. Sub-micron, dense metallic catalysts and films are deposited within porous hollow substrates to create the membranes using the techniques of sol slip casting, film coating and electroless plating (hereinafter ELP). Embodiments of the method involve forming a layer of catalytic nanopores grown from a base catalyst layer encapsulated in a porous layer, synthesized by novel techniques that impart unique features intended to overcome the aforementioned hurdles. The combinations of the techniques enable the synthesis of unique composite membrane structures in which the primary permeation layer are ultrathin (~1-2 µm).

In an embodiment, a catalytic membrane comprises one or more porous hollow substrates. The membrane further comprises a first porous layer coated on to the porous hollow substrates. In addition, a first catalyst layer is formed on the first porous layer. The first catalyst layer comprises a catalyst. The membrane also comprises a second porous layer deposited on the first catalyst layer. The pores of the second porous layer are filled with the catalyst.

In an additional embodiment, the membrane may optionally comprise a second catalyst layer.

In another embodiment, a method of forming a catalytic membrane comprises coating one or more porous hollow substrates with a first porous layer. The method also comprises depositing a catalyst on the first porous layer to form a first catalyst layer. In addition, the method comprises depositing a second porous layer to cover the first catalytic layer. Moreover, the method comprises filling the pores of the second porous layer with the catalyst to form the catalytic membrane.

The foregoing has outlined rather broadly the features and technical advantages of embodiments of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

NOTATION AND NOMENCLATURE

Figure 1:
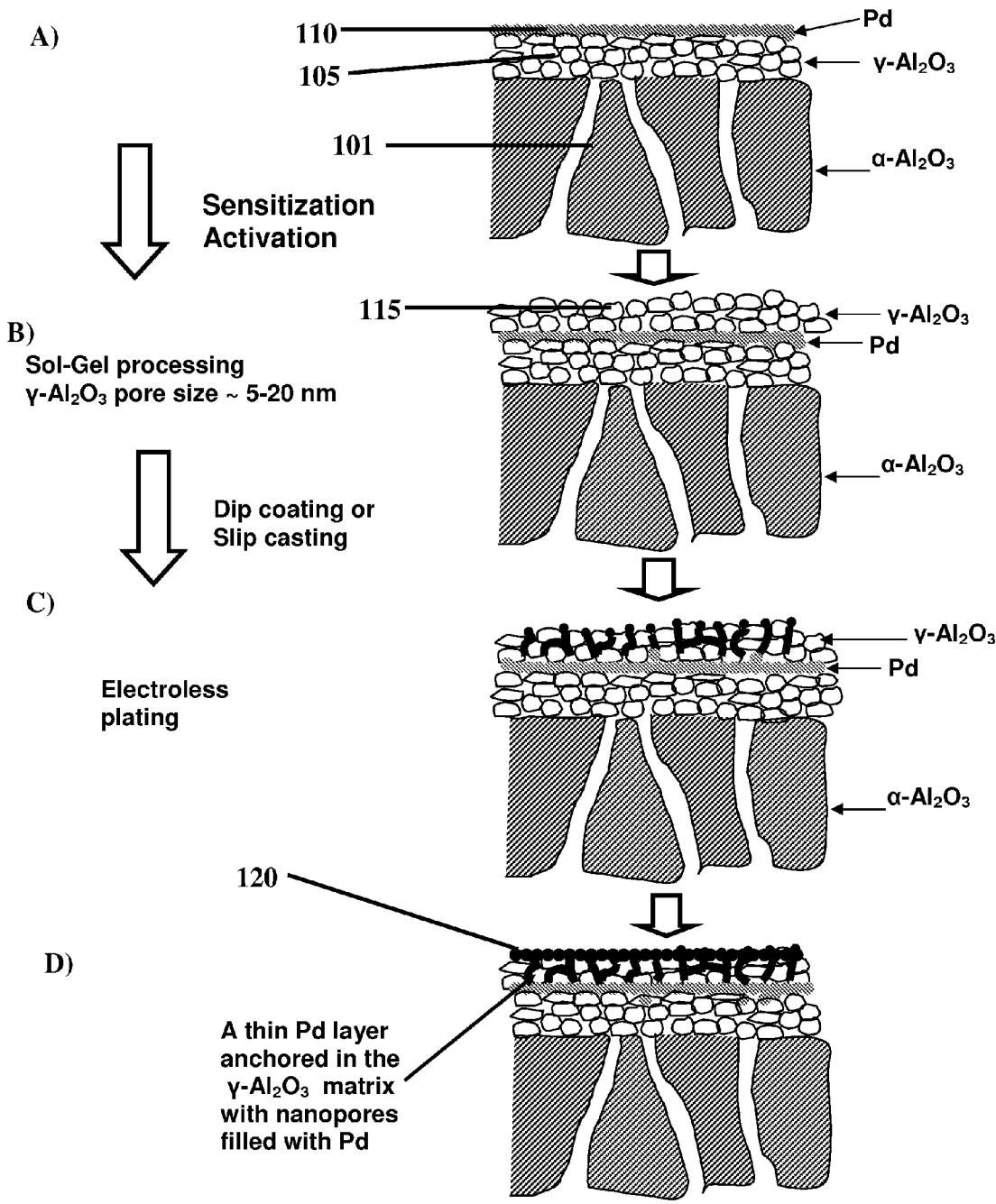
FIGS. 1A-D illustrates a method for preparing embodiments of the membrane.

Certain terms are used throughout the following description and claims to refer to particular system components. This document does not intend to distinguish between components that differ in name but not function.

In the following discussion and in the claims, the terms "including" and "comprising" are used in an open-ended fashion, and thus should be interpreted to mean "including, but not limited to . . . ".

As used herein, the term "nanopores" refers to pores having an average diameter of no more than 100 nm. The term "nanoporous" refers to materials having nanopores.

DETAILED DESCRIPTION OF THE PREFERRED EMBODIMENTS

FIG. 1A, illustrates an embodiment of a novel composite membrane comprising a series of deposited layers upon one or more porous hollow substrates 101. The chemical composition and stability of the substrate is such that it is capable of withstanding processing temperatures and pressures. In particular, embodiments of the membrane comprise a porous hollow substrate 101. Porous hollow substrate 101 is coated with at least a first porous layer 105 deposited on the porous hollow substrate. In addition, a first catalytic layer 110 is plated on the first porous layer. FIG. 1B illustrates a second porous layer 115 deposited on first catalytic layer 110. Furthermore, FIG. 1C; D show a second catalytic layer 120 optionally plated on second porous layer 115.

The porous hollow substrate 101 may be comprised of ceramics, metals, composites or other suitable materials known to one skilled in the art. Preferably, the substrate is comprised of a ceramic. The ceramic substrate may comprise alumina (e.g. $Al_2O_3$), silica, zirconia, other porous ceramics known to one skilled in the art, or combinations thereof. In one embodiment, the porous ceramic substrate comprises α-$Al_2O_3$.

Hollow porous substrate 101 preferably has nanopores. Specifically, the porous substrate may contains pores having average diameters ranging from about 50 nm and about 300 nm, preferably ranging from about 100 nm and about 300 nm, more preferably ranging from about 100 nm and about 200 nm.

Figure 3:
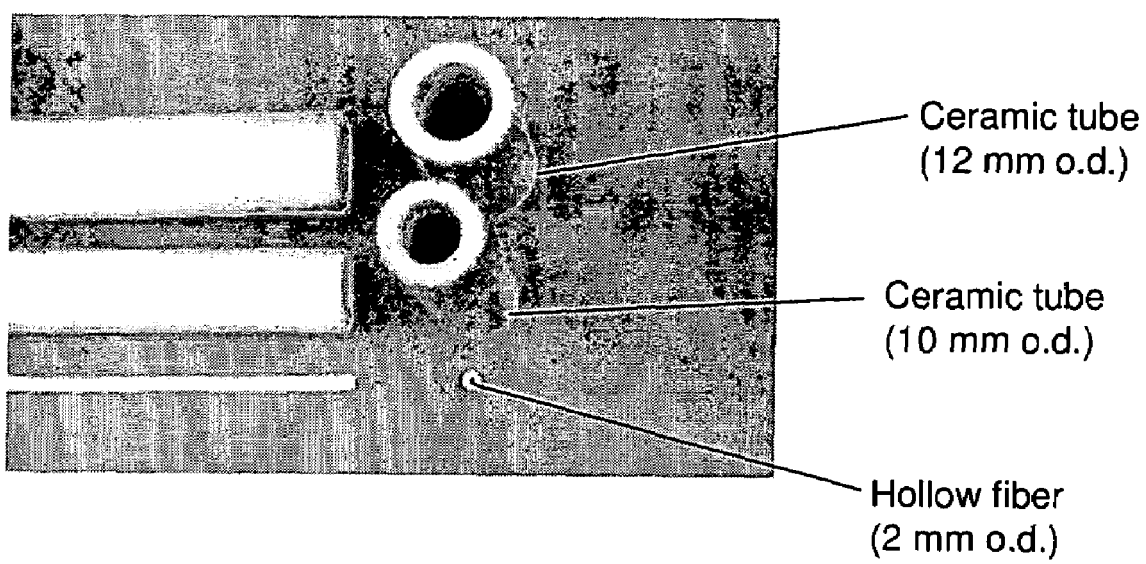
FIG. 3 is a photograph of ceramic hollow fibers and tubes used as hollow porous substrates.
Figure 4:
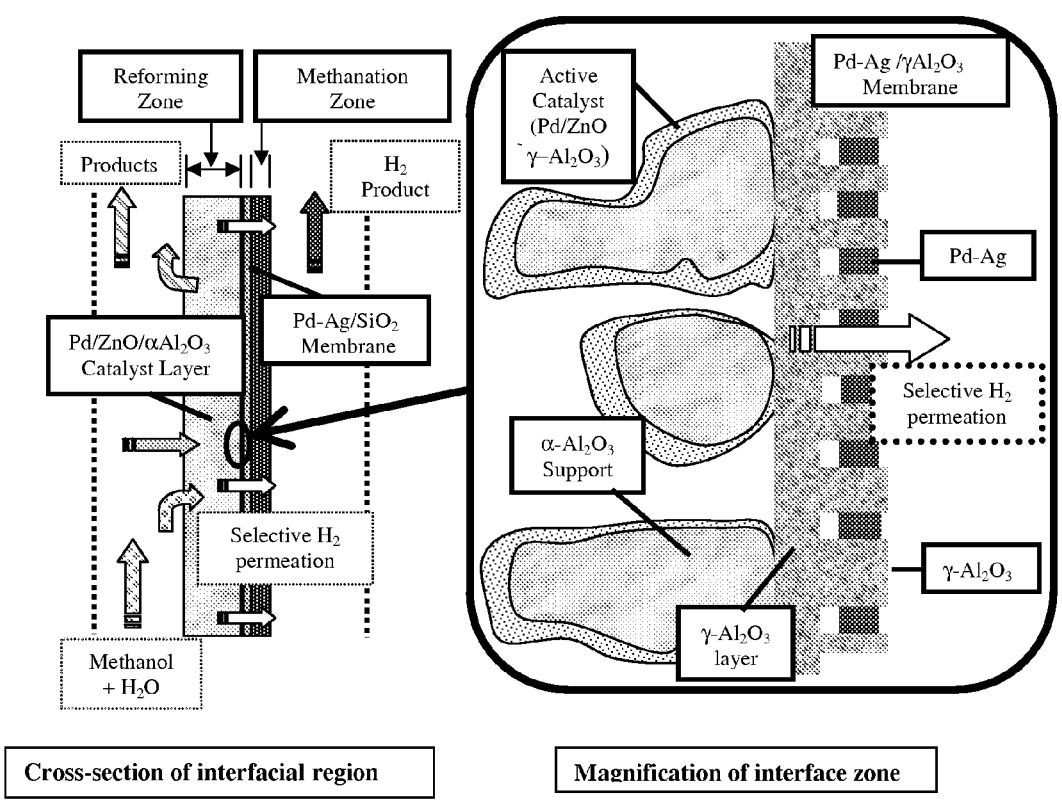
FIG. 4 is a cross-sectional schematic of the multi-layer membrane for hydrogen generation, separation and purification.

In embodiments, the porous hollow substrate 101 may comprise a hollow tube or cylinder. More specifically, porous hollow substrates may comprise hollow fibers. The cross-section of the tube may be any shape, such as but not limited to, circular, rectangular, polygonal, or alternative irregular shapes. In a particular embodiment, the substrate is a long circular cylinder as shown in FIG. 3. The outer diameter of the cylinder may range from about 1 mm to about 12 mm, preferably ranging from about 1 mm to about 5 mm, and more preferably ranging from about 2 mm and about 3 mm. The length of the cylinder may be any length, suitable for the processing methods and devices. In embodiments, the length may from about 1 in to about 36 in, preferably ranging from about 6 in to about 24 in, and more preferably ranging from about 6 in to about 18 in.

In embodiments, the hollow porous substrate 101 is coated with a first porous layer 105. First porous layer typically 105 comprises a ceramic material having smaller pores than the pores of the hollow porous substrate. First porous layer 105 is preferably deposited on the inner surface of the hollow porous substrate 101. First porous layer 105 may comprise materials such as without limitation, ceramics, metals, composites and combinations thereof. Preferably, the first porous layer 105 is comprised of a ceramic. The ceramic may comprise alumina, silica, zirconia or other porous ceramics known to one of skill in the art. In a specific embodiment, the first porous layer 105 comprises γ-$Al_2O_3$. First porous layer 105 may have a thickness ranging from about 0.5 microns to about 10 microns in thickness, preferably between about 2 microns and about 7 microns thick, more preferably between about 3 microns and about 5 microns thick. In embodiments the porous ceramic layer 105 contains pores between about 1 nm and about 25 nm, preferably between about 5 nm and about 20 nm, more preferably ranging from about 5 nm to about 10 nm. The first porous layer 105 allows for dense and essentially uniform nucleation sites for deposition of catalyst over the periphery of the hollow porous substrates.

Generally, first porous layer 105 is coated with first catalyst layer 110. First catalyst layer 110 generally comprises a catalytic metal. In some embodiments, first catalyst layer 110 is a continuous impermeable coating of a catalytic metal (e.g. Pd). Alternatively, first catalyst layer 110 may comprise a plurality of metal nuclei deposited upon the porous layer 105. First catalyst layer 110 may comprise any material known to one skilled in the art to have catalytic activity in the coupled generation, separation, and purification of hydrogen. Generally, the catalyst may comprise a transition metal. Examples of catalytic metals include without limitation, palladium, platinum, silver, gold, copper, or combinations and alloys thereof.

In another embodiment, a second porous layer 115 is deposited on first catalytic layer 110 such that the catalytic layer is encapsulated with the second porous layer. Second porous layer 115 may comprise materials similar to first porous layer such as without limitation, ceramics, metals, composites and combinations thereof. Preferably, second porous layer 115 comprises a ceramic material such as alumina. In addition, second porous layer 115 may comprise a material different or the same from the first porous layer 105. In an embodiment, first and second porous layers both comprise $\gamma$-$Al_2O_3$. Second porous layer 115 may have a thickness ranging from about 0.5 microns to about 10 microns in thickness, preferably between about 2 microns and about 7 microns thick, more preferably between about 3 microns and about 5 microns thick.

Without being limited by theory, the encapsulation of the first catalyst layer 110 by second porous layer 115 may serve several roles. First, second porous layer 115 may penetrate any defects in the underlying catalyst layer 110. This improves the permselectivity of the overall composite membrane by filling the defect with a porous medium (e.g. alumina), thereby reducing defect flux. Moreover, second porous layer 115 may serve as a porous medium for subsequent intrapore growth of a second catalyst later, as described below. Third, in a membrane reactor application the second porous layer 115 may prevent the direct contact of the first catalyst layer 110 with particles which may induce potential damage to the first catalyst layer.

The structure of second porous layer 115 is a second porous layer that has pores filled with a catalyst (e.g. Pd) where the surface of second porous layer 115 may optionally be covered with a second catalyst layer 120. FIG. 1D illustrates the three dimensional, interconnected pore network of the second porous layer, therefore the resultant structure is interconnected sheaths or structures of catalyst. The thickness of these sheaths or structures therefore corresponds to the diameter of the pores of the second porous layer. Thus, the sheaths may have diameters ranging from about 5 nm to about 15 nm. The permselectivity is imparted by the external catalyst layer contiguous with the array of catalyst-filled nanopores and underlying catalyst base layer. This type of encapsulated nanopore membrane may be suitable for applications in more aggressive environments. Without being bound by theory, an advantage of this novel structure is that the first catalyst layer is not directly exposed to potential poisons or abrasive media.

According to another embodiment, the membrane comprises a second catalyst 120 layer plated or deposited on to second porous layer 115. Second catalyst layer 120 preferably comprises the same catalyst as first catalyst layer 110. However, it is envisioned that second catalyst layer 120 may also comprise a different catalyst than first catalyst layer 110. Examples of suitable materials for use as the second catalyst layer include without limitation, palladium, platinum, silver, gold, copper, and combinations thereof. Second catalyst layer may have a thickness ranging from about 0.1 micron to about 10 microns in thickness, preferably between about 0.1 micron and about 5 microns thick, more preferably between about 0.01 micron and about 1.5 microns thick.

In an embodiment, a method of forming the above described membranes comprises depositing a first porous layer 105 on to hollow porous substrate 101. First porous layer 105 may be deposited upon the porous ceramic substrate 101 by any method known to one skilled in the art, such as without limitation, slip-casting, dip-casting, high pressure solution introduction or differential bath treatments. In one embodiment, the first porous layer 105 may be deposited by slip casting. For example, the hollow porous substrates may be coated by slip casting a boehmite sol. The boehmite sol may be prepared by the acid-catalyzed hydrolysis of an aluminum alkoxide.

In addition, a range of first porous layer thicknesses 105 may be achieved by multiple dip coating, drying, and calcination cycles. Calcination may be carried out at any suitable temperatures and times. More specifically, calcination may be performed at temperature ranging from at about 300° C. to about 500° C., preferably at about 400° C. to about 450° C., and more preferably at about 450° C. The calcination may be conducted for a time of about 2 hr to about 5 hr, preferably about 3 hr to about 5 hr, and more preferably for about 3 hr to about 4 hr.

In an embodiment, the method further comprises using a modified ELP method to deposit first catalyst layer 110 on to first porous layer 105. In particular, a catalytic metal (e.g. Pd alloy) is deposited within the pores of the first porous layer by seeding the first porous layer 105 with catalytic nuclei or crystallites. The crystallites serve as nucleation sites for growth of first catalyst layer. The metal nuclei serve as precursors for electroless plating (ELP). In ELP, a plating solution is circulated through the hollow porous substrate/first porous layer structure. In embodiments, the ELP may be conducted at a circulation rate between about 300 ml/min and about 600 ml/min, preferably ranging from about 400 ml/min and about 600 ml/min, more preferably ranging from about 500 ml/min and about 600 ml/min. The plating surface area per volume of bath may range from between about 300 $cm^2/l$, and about 500 $cm^2/l$, preferably between about 330 $cm^2/l$ and about 500 $cm^2/l$, more preferably between about 330 $cm^2/l$ and about 400 $cm^2/l$. The plating solution circulation times may range between about 1 hr and about 8 hrs, preferably between 4 hrs and 5 hrs, or more preferably until the plating solution becomes murky. The plating may be conducted with ambient temperature baths between about 23° C. and about 25° C. In ELP, the catalyst plated on the hollow porous substrate/first porous layer structure is preferably the same catalyst as previously seeded. In embodiments, the catalyst is palladium, platinum, silver, coppers, gold, other transition metals and their alloys, as known to one skilled in the art, or combinations thereof.

The method may further comprise depositing or encapsulating the first catalyst layer 110 with a second porous layer 115. This deposition may be done by contacting the hollow porous substrate 101/first porous layer 105/first catalyst layer 110 structure with a sol followed by drying and calcinations. Calcination may be performed at temperature ranging from about 300° C. to about 500° C., preferably at about 400° C. to about 450° C., and more preferably at about 450° C. The calcination is conducted for a time of about 2 hr to about 5 hr, preferably about 3 hr to about 5 hr, and more preferably for about 3 hr to about 4 hr. The coating step may be conducted multiple times (e.g. 2 to 4 times) to ensure a continuous second porous layer 115. Each step may be followed by drying and calcination. Alternatively, instead of coating the first catalyst layer using the above described technique, the second porous layer 115 may be deposited over the first catalyst layer 110 using sol-gel slip casting. This technique creates a thin layer (e.g. about 1 micron) of catalyst encapsulated between two $\gamma$-$Al_2O_3$ layers.

Embodiments of the method may further comprise filling the pores of the second porous layer 115 with a catalyst. More particularly, electroless plating (ELP) may be used to fill the second porous layer 115. The hollow porous substrate 101/first porous layer 105/first catalyst layer 110/second porous layer 115 structure may be contacted with an electroless plating solution. The ELP solution generally comprises a catalyst to be deposited in liquid form. Upon contacting the hollow fiber with the ELP solution, the liquid may fill the pores of the second porous layer 115 by capillary action. Liquid is prevented from invading the underlying pores of the first porous layer 105 because of first catalyst layer 110, which is essentially impermeable. Additional catalyst is thus also deposited on the first catalyst layer 115. The plating precursor species (e.g. Pd ions, hydrazine, etc.) may diffuse through the pores of second porous layer 115 to the first catalyst layer 110 where deposition occurs. Duration of the plating time may range from about 10 minutes to about 90 minutes, preferably from about 20 minutes to about 60 minutes, more preferably from about 30 minutes to about 50 minutes. A thickness monitor reading may serve as a guide to follow the growth process. Prolonged plating may result in the outer layer of the second porous layer 115 covered by an external second catalyst layer 120.

Alternatively, embodiments of the method may include sol-gel slip casting over first catalyst layer 110 to form second porous layer 115. In such embodiment, the first catalyst layer 110 preferably comprises metal nuclei and the resulting product is a plurality of metal nuclei disposed between first and second porous layers 105, 110. The pores of second porous layer 115 may then be filled by using electroless plating. The species contained in the electroless plating solution (e.g. Pd ions, hydrazine, etc.) may diffuse through the pores of the outer $\gamma$-$Al_2O_3$ layer to the catalyst seed layer 110. As metal nuclei are good catalysts for oxidation, catalyst deposition may take place instantaneously due to cathodic reduction of the metal complex. Catalyst deposition thus proceeds from the base layer 110 of nuclei towards the outer surface of second porous layer 115.

In embodiments the porous ceramic fibers, with catalyst layers deposited by one of the aforementioned protocols are used for the production of hydrogen from a gas mixture. In embodiments the gas mix is introduced into the internal matrix of the cylindrical tube or fiber. In embodiments, the gas mix is introduced at elevated temperature and pressure to maximize hydrogen permeation through the membrane. The parameter of pressure, temperature, and time are based on other contents in the gas mix, atomic mass or other materials, flux and permeation time as known to one skilled in the art. In preferred embodiments the pressure is less than about $5\times10^5$ Pa; at temperatures above 23° C. and less than 600° C.; conducted for between about 2 hrs and about 25 hrs, preferably about 2 hrs and about 10 hrs, most preferably for about 4 hrs to about 6 hrs.

To further illustrate various illustrative embodiments of the invention, the following examples are provided.

EXAMPLE

Porous Hollow Fibers for Supports

The permselective Pd alloy or silica films were deposited on/in small diameter, porous ceramic hollow fibers. Recent advances in the fabrication of porous ceramic (alumina) hollow fibers result in fibers having a much higher surface area per unit volume (i.e., up to 1000 $m^2/m^3$). This enabled the use of thicker membranes for durability reasons, while maintaining high volume productivity.

The $\alpha$-$Al_2O_3$ hollow fiber ceramic supports used in this study had a uniform composition and morphology (0.15 μm nominal pore diameter) and had dimensions of 1 mm inner diameter, 2 mm outer diameter and a length of 1 foot (supplied by Ceparation®, Helmond, the Netherlands). Before use, the fiber supports were rinsed with isopropyl alcohol and deionized water, dried in an oven at 120° C. for 12 hours, then calcined from 600-800° C. in a box furnace for 3 hours at a rate of 1° C./min.

The $\alpha$-$Al_2O_3$ fibers were coated by slip casting a boehmite sol. The boehmite sol was prepared by the acid-catalyzed hydrolysis of an aluminum alkoxide. A range of alumina loadings was achieved by multiple dip coating, drying, and calcination cycles. Calcination was carried out at 450° C. for 3-4 hours. The resulting top layer of $\gamma$-$Al_2O_3$ afforded a smoother surface because of the smaller pore size (5-15 nm pore diameter). The thickness of the $\gamma$-$Al_2O_3$ was estimated based on mass measurements with assumed alumina density.

Ultrathin, Intra-Support Pd Alloy Layers

Pd membrane synthesis on the coated hollow fibers was done by electroless plating (ELP) in a circulating multi-fiber apparatus. The ELP procedure comprised support sensitization, activation (preplating), and plating steps. The Pd layer thickness was monitored in situ using a quartz crystal microbalance (Maxtek® PM-700 series) which was interfaced with a PC. The thickness corresponded to that which can be obtained on a Pd preplated surface. This agreed within 10% to Pd mass uptake on preplated $\alpha$-$Al_2O_3$ fibers. The coated fibers were then rinsed with deionized water and kept in an oven at 120° C. Before permeation with $H_2$, the membranes were reduced at ~370° C. for 2-3 h in pure $H_2$ stream.

Figure 2:
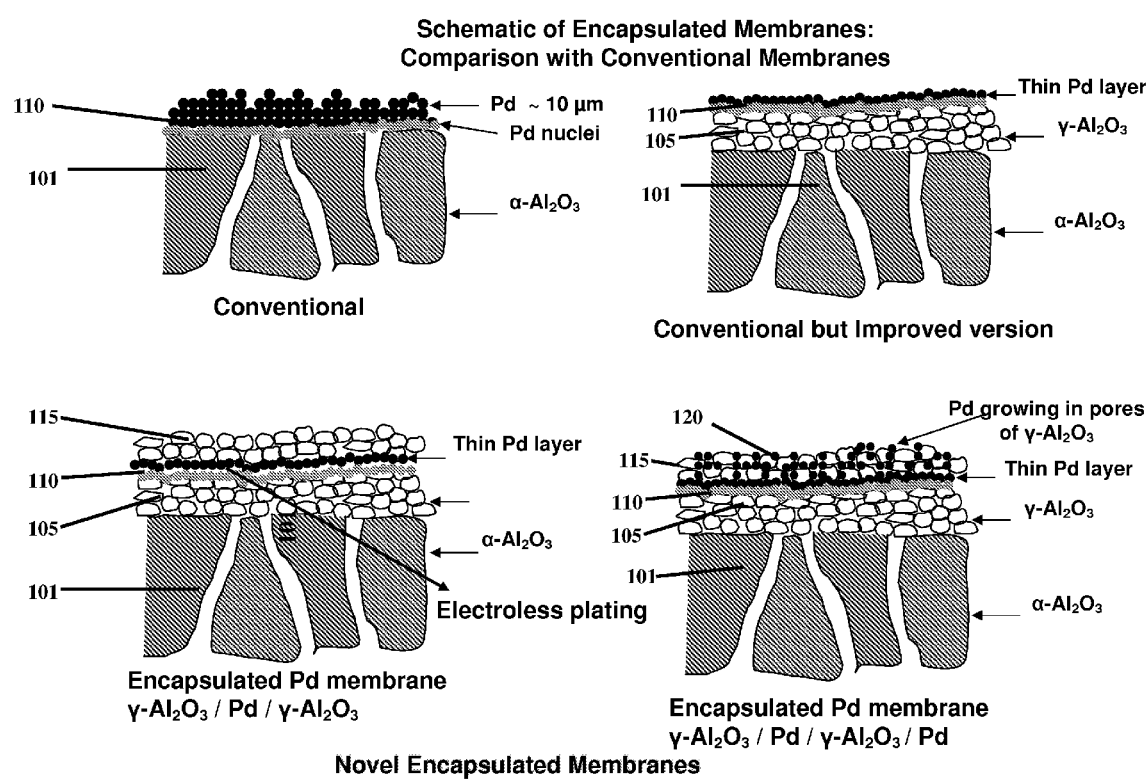
FIG. 2 is a comparison of conventional electroless plating (ELP) with an intrapore deposition ELP method.

FIG. 2 shows a schematic that compares the intrapore deposition concept to the more conventional external plating approach. Metal crystallites were pre-impregnated on the pore walls of a porous alumina top layer of about 1 μm thickness and having approximately 5 nm pores. The Pd crystallites served as seeds for growth of Pd during the subsequent plating process. Film growth occurred preferentially within the alumina top layer. With proper timing of the growth, sub-micron films were achieved that span the pore diameter.

FIG. 1 shows a schematic illustrating the procedure for synthesizing Pd encapsulated nanopore membranes that combines ELP and sol-gel processing.

Multi-layer Catalytic Membrane for Coupled Permselectivity and Purification

Previous results have shown that thinner Pd membranes have reduced hydrogen permselectivity due to the presence of defects, most notably pinholes. A thin layer of Ni/$\gamma$-$Al_2O_3$ may be used to convert any CO (to inert methane) that leaks through defects. A membrane having a lower permselectivity may be tolerable if it is coupled with such a methanation catalytic membrane.

The base composite for each membrane was a 1-4-μm thick top layer of $\gamma$-$Al_2O_3$ coated on the external surface of the $\alpha$-$Al_2O_3$ fiber. The top layer was synthesized by the slip casting method described above. TABLE 1 provides the nomenclature and structure of the different variants of membranes synthesized. It also provides the measured loading of the Pd in each of the membranes (in g Pd/m² fiber). Because the thickness can only be inferred from the thickness monitor data, the loadings provide a measure of the effectiveness of Pd utilization. The "equivalent Pd thickness" was determined by dividing the Pd loading by the product of the density of Pd (12 g/cm³) and the exposed external area of the membrane.

followed by drying and calcination steps. The resultant composite $\gamma$-$Al_2O_3$/Pd/$\gamma$-$Al_2O_3$/$\alpha$-$Al_2O_3$ membrane had a ca. 0.2-0.3 μm thick $\gamma$-$Al_2O_3$ top layer.

Pd Encapsulated Nanopore Membrane

The "Pd Encapsulated Nanopore Membrane" was prepared using the above-described M-E membrane as the starting material. Additional Pd was plated onto the underlying, encapsulated Pd layer by another ELP step. The approach was as follows. Upon contacting the hollow fiber with the ELP solution, the liquid fills the $\gamma$-$Al_2O_3$ pore structure by capillarity. Liquid was prevented from invading the underlying

TABLE 1

Membrane Structure and Nomenclature

| Symbol | Membrane Type | Composite Structure | Pd Loading (g Pd/m² fiber)/ Equivalent Pd Thickness (μm) | Comments |
|---|---|---|---|---|
| M-C | Conventional Pd Membrane | Pd/$\gamma$-$Al_2O_3$/$\alpha$-$Al_2O_3$ 1.1 μm/4 μm/fiber | $\frac{13.1}{1.1}$ | $\gamma$-$Al_2O_3$ is coated on $\alpha$-$Al_2O_3$ fiber; Pd deposited by ELP on seeded $\gamma$-$Al_2O_3$ |
| M-E | Pd Encapsulated Membrane | $\gamma$-$Al_2O_3$/Pd/$\gamma$-$Al_2O_3$/$\alpha$-$Al_2O_3$ 0.3 μm/1.1 μm/4 μm/fiber | $\frac{12.6}{1.1}$ | Top layer of $\gamma$-$Al_2O_3$ is coated on Pd creating encapsulated layer of Pd |
| M-EN | Pd Encapsulated Nanopore Membrane | Pd-$\gamma$-$Al_2O_3$/Pd/$\gamma$-$Al_2O_3$/$\alpha$-$Al_2O_3$ 0.5 μm – 0.3 μm/1 μm/ 4 μm/fiber | $\frac{19.0}{1.6}$ | Pd is grown by ELP from encapsulated Pd layer within top layer of $\gamma$-$Al_2O_3$ |
| M-N1 | Pd Nanopore Membrane | Pd-$\gamma$-$Al_2O_3$/Pd nuclei/$\gamma$-$Al_2O_3$/$\alpha$-$Al_2O_3$ 0.6 μm – 0.5 μm/--/ 4 μm/fiber | $\frac{7.4}{0.6}$ | Pd is grown by ELP from encapsulated Pd nuclei; growth of 0.5 μm Pd layer within $\gamma$-$Al_2O_3$ top layer |
| M-N2 | Pd Nanopore Membrane | Pd-$\gamma$-$Al_2O_3$/Pd nuclei/$\gamma$-$Al_2O_3$/$\alpha$-$Al_2O_3$ 2.6 μm – 1 μm/--/4 μm/fiber | $\frac{31.5}{2.6}$ | Pd is grown by ELP from encapsulated Pd nuclei; growth of 2 μm Pd layer occurs within/on top of $\gamma$-$Al_2O_3$ top layer |

Pd Nanopore Membranes Synthesis

Thin and stable membranes on symmetric $\alpha$-$Al_2O_3$ supports required an overlayer of $\gamma$-$Al_2O_3$ which provides a smoother surface and smaller pores. The outside surface of ceramic fibers and tubes was routinely coated with a $\gamma$-$Al_2O_3$ film via slip casting of a boehmite sol (prepared by the acid-catalyzed hydrolysis of an aluminum alkoxide). The calcined sol-gel alumina layer had a narrow pore size distribution with a nominal pore diameter in the range of 5-15 nm. A range of film thicknesses was achieved (1-10 μm) by single or repeated dippings/calcinations. Gravity flow of the boehmite sol through the fiber lumen was readily carried out.

The second step involves creation of nucleation sites of Pd using conventional sensitization and activation techniques.

Pd Encapsulated Membrane Synthesis

The "Pd Encapsulated Membrane" was prepared by coating a second $\gamma$-$Al_2O_3$ film on top of the continuous Pd layer. This was done by contacting the Pd/$\gamma$-$Al_2O_3$/$\alpha$-$Al_2O_3$ fiber with the boehmite sol for 60 seconds, followed by room temperature drying and calcination (~450° C. and for 3-4 hours). The film coating was conducted two times to ensure a continuous layer of $\gamma$-$Al_2O_3$ top layer and each coating was $\gamma$-$Al_2O_3$ and $\alpha$-$Al_2O_3$ pores because of the dense Pd layer was essentially impermeable. Pd deposition commenced on the Pd layer. The plating precursor species (Pd ions, hydrazine, etc.) diffused through the pores of $\gamma$-$Al_2O_3$ layer to the Pd layer where deposition occurred. Deposition of Pd on surfaces other than Pd was minimized provided the time of plating was less than the induction time for nucleation. The unseeded $\gamma$-$Al_2O_3$ layer coated membranes' induction time was on the order of 1 hour. Plating time was 45 minutes. The thickness monitor reading serves as a guide to follow the growth process. Prolonged plating results in the outer layer of $\gamma$-$Al_2O_3$ covered by an external Pd layer.

Pd Nanopore Membrane

Instead of coating a Pd layer as in the case of the Pd Encapsulated Membrane, a thin (~1 μm) $\gamma$-$Al_2O_3$ layer was coated over the Pd nuclei using sol-gel slip casting. This created a layer of Pd nuclei encapsulated between two $\gamma$-$Al_2O_3$ layers. Pd coating was then carried out using ELP. As the ELP procedure is autocatalytic, Pd will not deposit onto any surface other than Pd nuclei provided the time of plating was less than the induction time for nucleation. It is reported in the published literature that the induction time for nucleation for an unseeded support is of the order of ~30-60 minutes. For unseeded γ-Al$_2$O$_3$ layer coated membranes, the induction time is of the order of one hour. Following this procedure, a sample was obtained with Pd nuclei embedded or "sandwiched" between two γ-Al$_2$O$_3$ layers with the outer layer of γ-Al$_2$O$_3$ devoid of Pd nucleation sites. Hence during plating, the species contained in the plating solution (Pd ions, hydrazine, etc.) diffuse through the pores of the outer γ-Al$_2$O$_3$ layer to the Pd seed layer. As Pd nuclei are good catalysts for hydrazine (N$_2$H$_4$) oxidation, Pd deposition takes place instantaneously on the Pd nuclei due to cathodic reduction of the metal complex. Pd deposition grows from the base layer of nuclei towards the surface of the outer γ-Al$_2$O$_3$ layer.

The thickness monitor confirmed that the growth of Pd was contained in the pores. As the γ-Al$_2$O$_3$ layer pores were of the order of 5-15 nm the deposited Pd filaments had diameters in that range. The resulting membrane structure was an array of Pd nanopore material embedded in a γ-Al$_2$O$_3$ layer on a hollow fiber. Further plating results in the outer layer of γ-Al$_2$O$_3$ covered by an external Pd layer which can be controlled to submicron thickness. At this point the sample comprised a film of Pd layer anchored in the γ-Al$_2$O$_3$ layer on a hollow fiber.

In summary, the nanopore membrane and the method of synthesis is unique in the sense a γ-Al$_2$O$_3$ layer between the plating solution and Pd nuclei forces the deposition of Pd in the pores rather than in the surface as observed in conventional membranes. Also, prolonged plating gives rise to a film anchored firmly in the γ-Al$_2$O$_3$ matrix which is expected to give structural stability.

Another variant of the nanopore membrane also was developed which involved the growth of an external layer of Pd following the above procedure. This was followed by the deposition of an external layer of γ-Al$_2$O$_3$ using sol-gel coating. Further ELP can be done to fill the pores of the outer γ-Al$_2$O$_3$ layer. Here the Pd nanopore material grows from a base layer of submicron thick Pd rather than from the nuclei. This type of encapsulated Pd nanopore membrane can be suitable for application in more severe reaction environments. The rationale is that the inner base layer of Pd (~0.5-1 μm thick) is not directly exposed to potential poisons.

Finally, the same techniques described above can be followed in the preparation of Pd alloy membranes. That is, if plated with a co-deposition bath containing Pd and Ag, or by the sequential plating of Pd and Ag, it will yield a Pd/Ag alloy nanopore membrane which can be used for low temperature (<300° C.) applications. Apart from delivering high permselectivity (separation factor and H$_2$ flux), the amount of Pd used was minimal and hence could be very economical. This unique method of encapsulation and growing the Pd nanopore membranes circumvented the problem of low permselectivity in the inorganic dense metal membrane technology.

Comparison of M-E and M-EN

The conventional 1 μm thick Pd membrane supported on γ-Al$_2$O$_3$ can have some defects in the form of cracks and pinholes. During electroless plating, growth of the Pd was nonuniform in the locale of these underlying defects. For ultrathin Pd films (δ<1 μm), incomplete coverage can result, which can undermine the permselectivity. During a single boehmite film coating step, the defects were filled by capillary action and, after drying and calcination, with nanoporous γ-Al$_2$O$_3$. Thus, any defects in this Pd encapsulated membrane (M-E) had a gap size on the order of the pore size of the γ-Al$_2$O$_3$. A second plating results in growth of Pd from the γ-Al$_2$O$_3$ underlying Pd layer, enabling the filling of the alumina pore, and defects, with Pd. The result was the Pd encapsulated nanopore membrane (M-EN). Indeed, very high separation factors were obtained for the M-EN membrane (>8000) exceeding those of the parent Pd encapsulated membrane while maintaining a very high H$_2$ flux of order of 0.1-0.4 mol/m$^2$s.

Results

Ultrathin (<1 μm), defect-free, and dense metallic (Pd alloy) and nanoporous silica membranes supported on porous ceramic hollow fibers were prepared. Commercially available porous α-Al$_2$O$_3$ fibers have an outer diameter of 0.5-2 mm and wall thickness of 50-100 μm. FIG. 3 shows the α-alumina tubes (8 and 12 mm outer diameter) and hollow fibers (2 mm outer diameter; 100 micron wall thickness) that are used for preparing supported membranes of Pd, Pd alloys, γ-Al$_2$O$_3$, and SiO$_2$.

Figure 5:
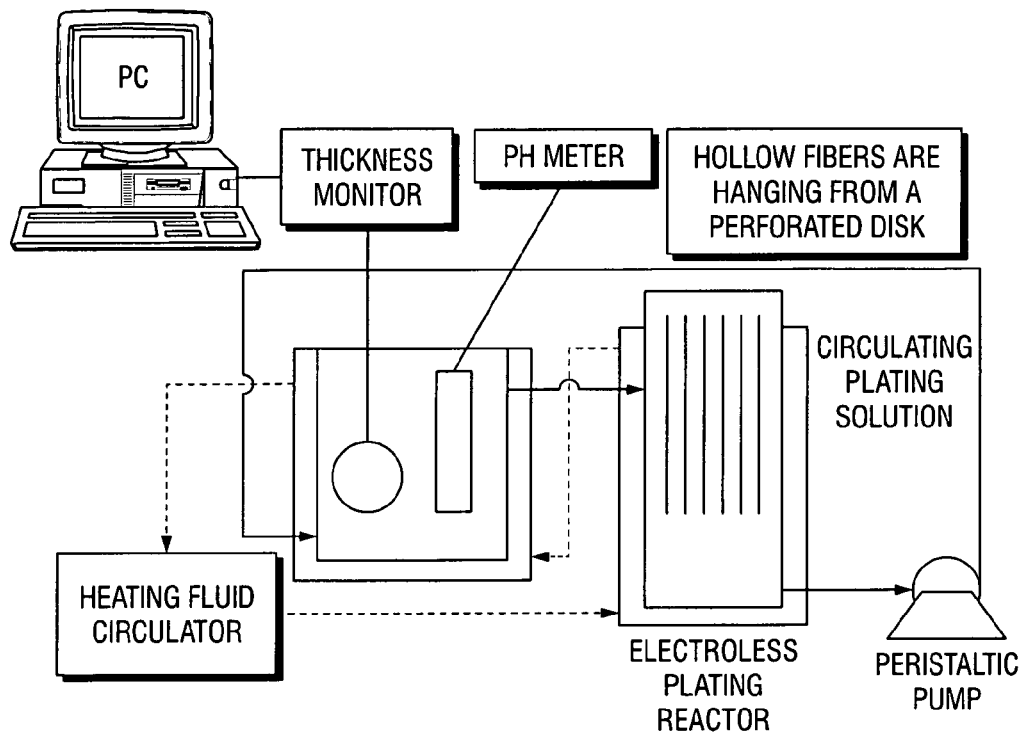
FIG. 5 is a schematic of the multi-fiber apparatus for carrying out the ELP.

For the Pd alloy membranes, the method of ELP was used in which the metal ions from solution grow on Pd metal crystallite seeds. ELP has been demonstrated for deposition of ca. 1 to 20 μm thick Pd and Pd alloy films onto flat plates and tubular supports. An apparatus that enables the simultaneous coating of up to several 25-cm long fibers was shown in FIG. 5. TABLE 2 shows some typical results comparing lab data to data from the literature.

TABLE 2

Comparison of Published and New Data (in bold)

| Membrane & Support Type | Thickness (μm) | Temp. (° C.) | ΔP$_{H2}$ (kPa) | Permeance × 10$^7$ (mole/ m$^2$ s Pa) | Permselectivity (H2/XX) |
|---|---|---|---|---|---|
| Pd/Steel | 6 | 400 | 100 | 5.82 (H$_2$) | Not given |
| Pd—Ag/Al$_2$O$_3$ | 7.5 | 500 | 200 | 8.5 (H$_2$) | 3030 (N$_2$) |
| Pd/Al$_2$O$_3$ | 13 | 500 | 200 | 24.5 (H$_2$) | Not given |
| Pd/Al$_2$O$_3$ fiber | 25 | 25 | 177 | 0.79 (H$_2$) | >5000 |
| Pd—Ag/Al$_2$O$_3$ fiber | 11 | 25 | 400 (N$_2$) | 0.25 × 10$^{-5}$ (N$_2$) | — |
| SiO$_2$/Al$_2$O$_3$ | 0.5 | 500 | 200 | 1.40 (H$_2$) | 70-90 (N$_2$) |

Figure 6:
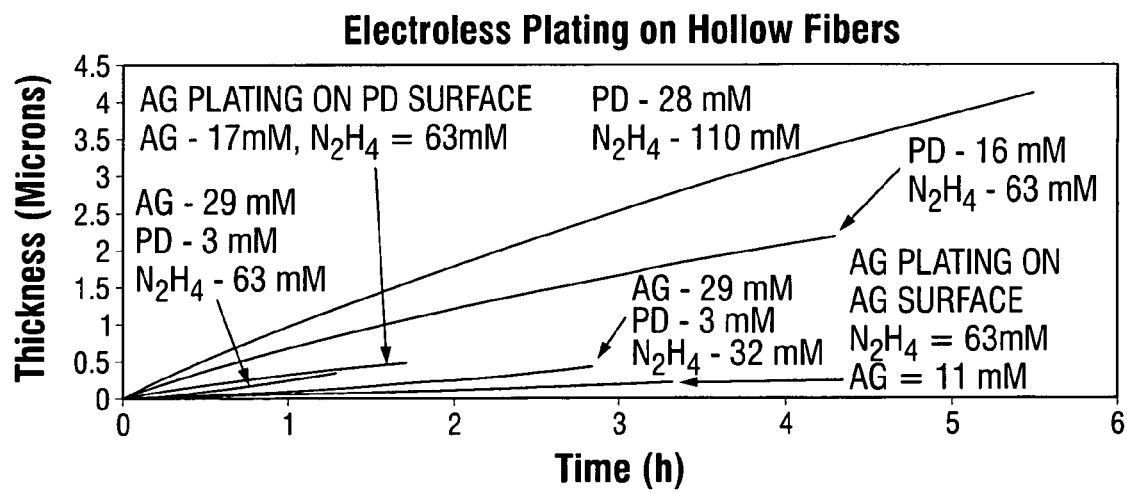
FIG. 6 is a graph showing the dependence of Pd and Ag film thickness as a function of time during ELP.

Following a pre-plating surface activation sequence of SnCl$_2$ and PdCl$_2$ in aqueous HCl solution, the support is contacted continuously with a flowing aqueous solution containing PdCl$_2$, EDTA.2Na, NH$_4$OH, and the reductant hydrazine (N$_2$H$_4$). The supply of hydrazine was carefully controlled to avoid bulk Pd precipitation and to obtain uniform deposition. Pd/Ag alloy membranes were synthesized through sequential deposition of Pd and Ag, followed by high temperature annealing. Using a plating monitor, the plating time was precisely pinpointed to achieve a desired thickness. Defect-free Pd and Pd—Ag films with thickness between 1 and 25 μm have been coated reproducibly on fibers. FIG. 6 shows typical temporal film thickness data.

Figure 7A:
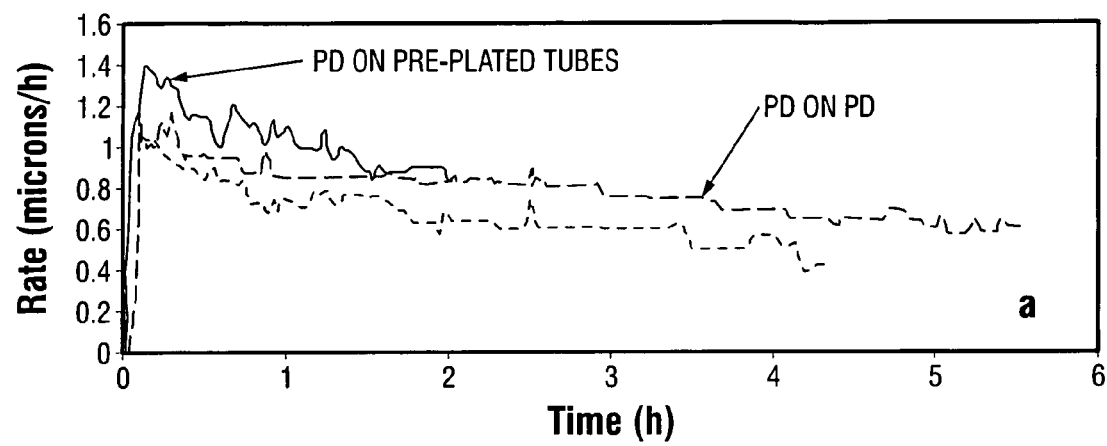
FIG. 7a and FIG. 7b show representative results in terms of film growth rate as a function of time for Pd and Ag films, respectively.
Figure 7B:
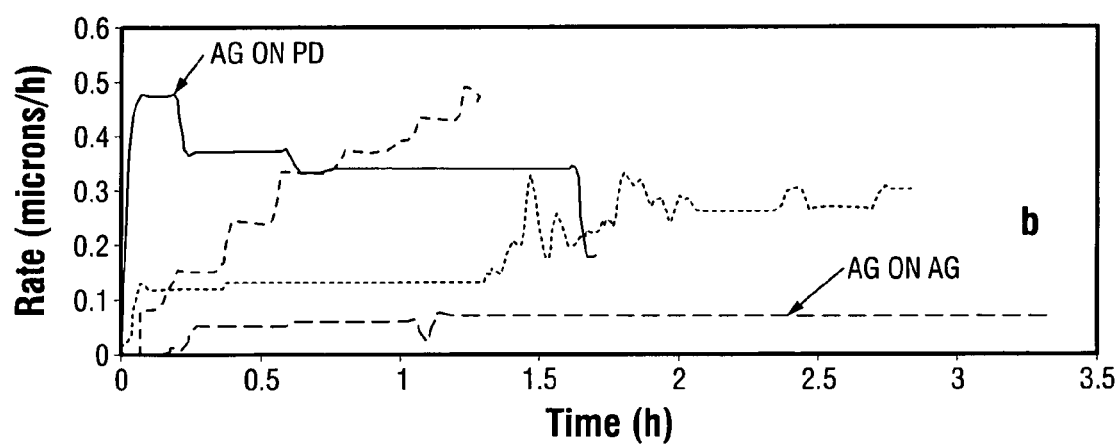
Figure 8A:
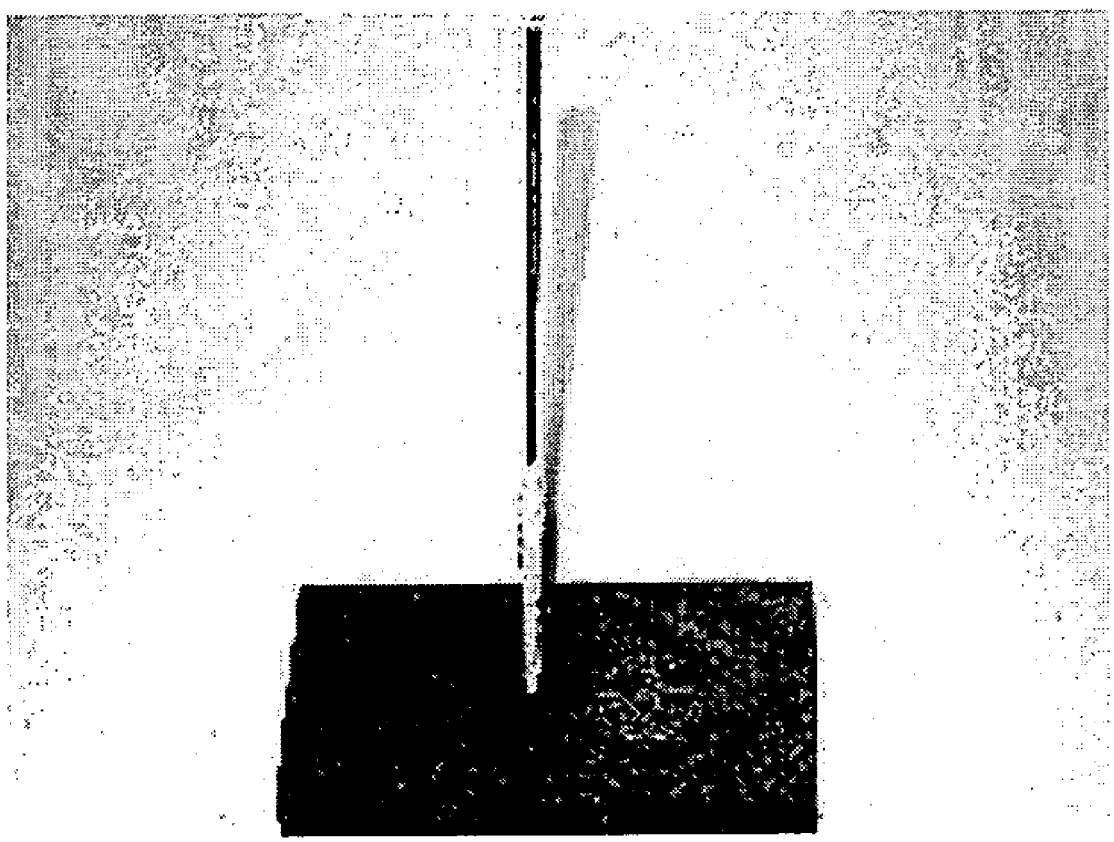
FIG. 8a is a photograph of a typical fiber coated with Pd/Ag membrane.
Figure 8B:
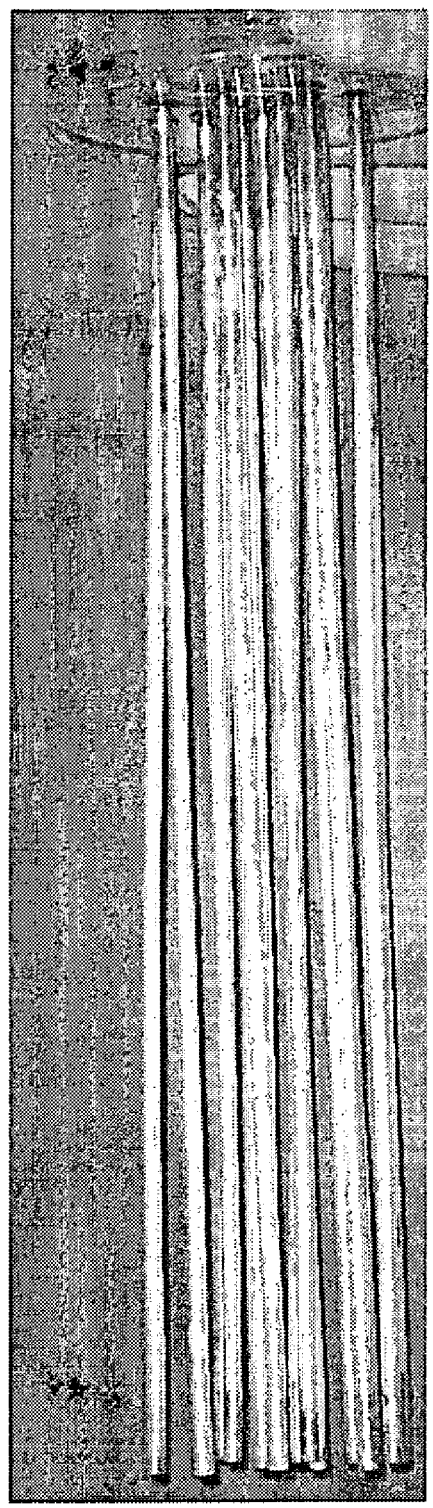
FIG. 8b is a Pd composite hollow fiber membrane tube bundle after ELP.
Figure 8C:
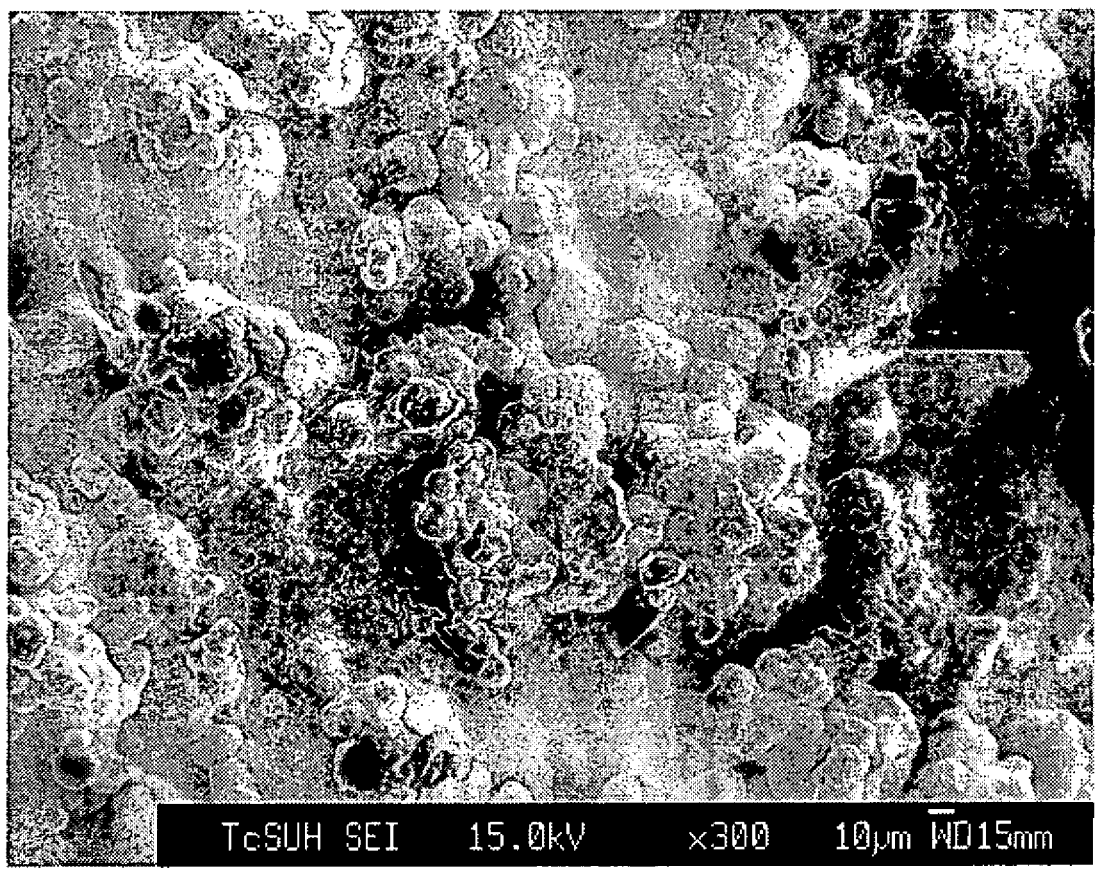
FIG. 8c is a SEM micrograph of a Pd film showing the fine grain structure.

Graphs in FIG. 7 show representative results in terms of film growth rate as a function of time for both Pd and Ag films. The data, divided into FIG. 7a and FIG. 7b, showed that the Pd growth rate achieved a maximum, as did the Ag coated on top of a Pd film. On the other hand, the Ag growth rate increased with time. Post-plating weighing of samples confirmed within 10% the overall film thickness. These growth data appeared to be the first to be reported with such a wide range of plating time. The membrane coating capability is essential for the alloys, which require precise thickness control to achieve a target fraction of Ag in Pd. SEM micrographs of the Pd-coated fiber reveal the fine-grain structure of the Pd, shown in FIG. 8.

Results of Pd Nanopore and Pd Encapsulated Membranes

Figure 9:
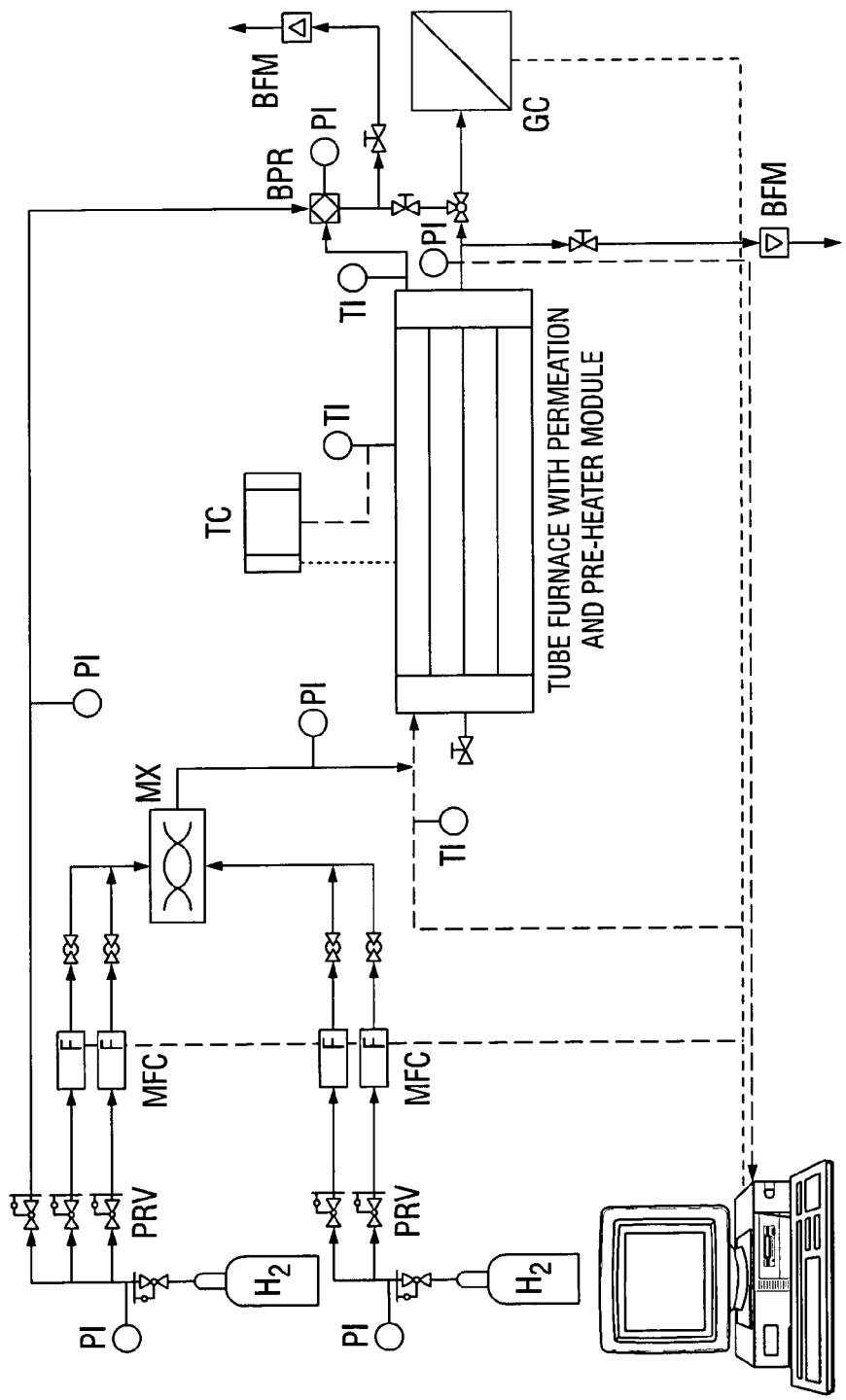
FIG. 9 is a schematic of the membrane permeation set up.
Figure 10:
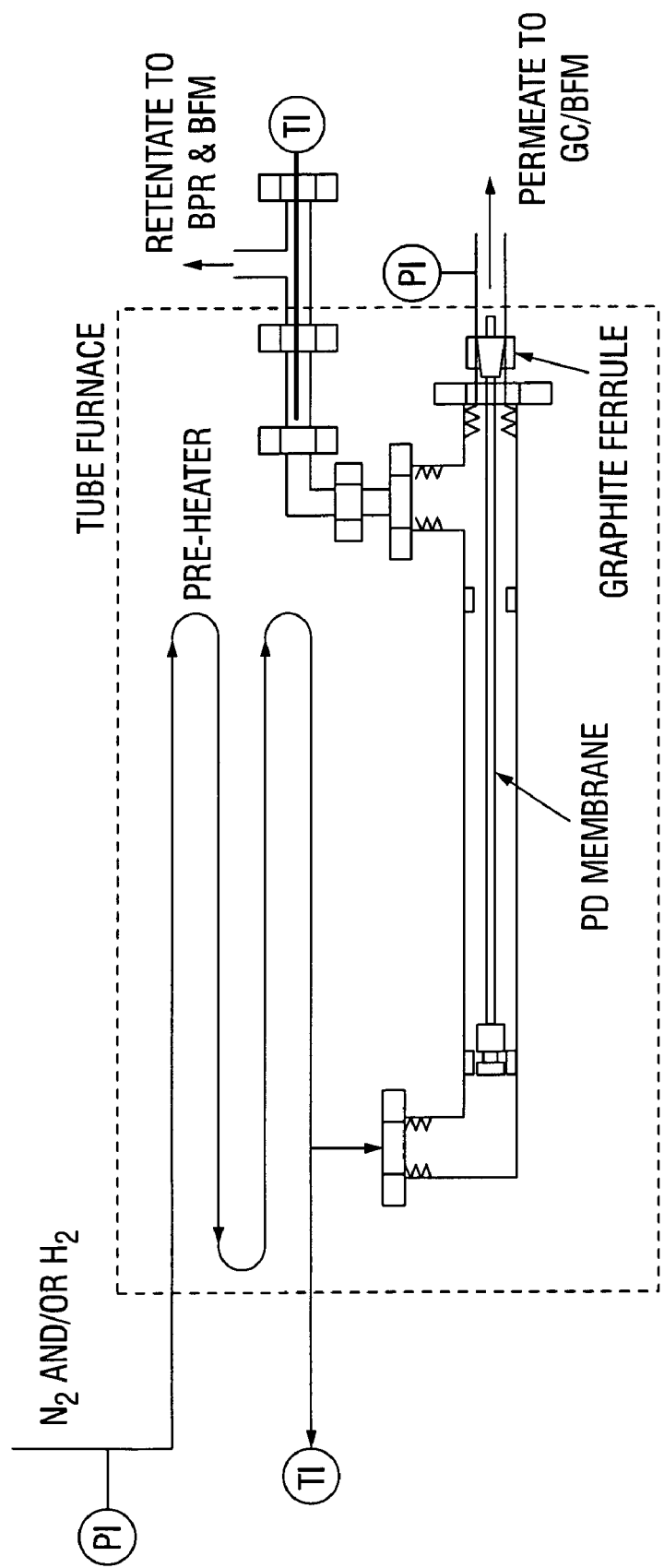
FIG. 10 shows the details of membrane permeator enclosed in a tube furnace.

Characterization of the transport features of the composite fiber membranes was conducted using a gas permeability apparatus as shown in FIG. 9. The single fiber permeation cell enabled single component and mixture flux measurements over a wide range of isothermal operation up to 750° C. and trans-membrane pressures up to 10 bar. Gas mixtures of prescribed compositions were metered to the feed and permeate chambers of the membrane unit. The permeate side was fed with an inert gas at atmospheric pressure or under vacuum, allowing control of the trans-membrane pressure gradient. Mixtures were monitored using a gas chromatograph with thermal conductivity and flame ionization detectors (Agilent model 6890). A more detailed schematic of the permeation cell is shown in FIG. 10.

Three different variants of the encapsulated membranes were synthesized and tested for operating time ~120-200 hours at a temperature ~370° C. The experiments were conducted for pure gas permeations (both $H_2$ and $N_2$) for trans-membrane pressure difference varying from 20 psi to 60 psi.

Figure 11:
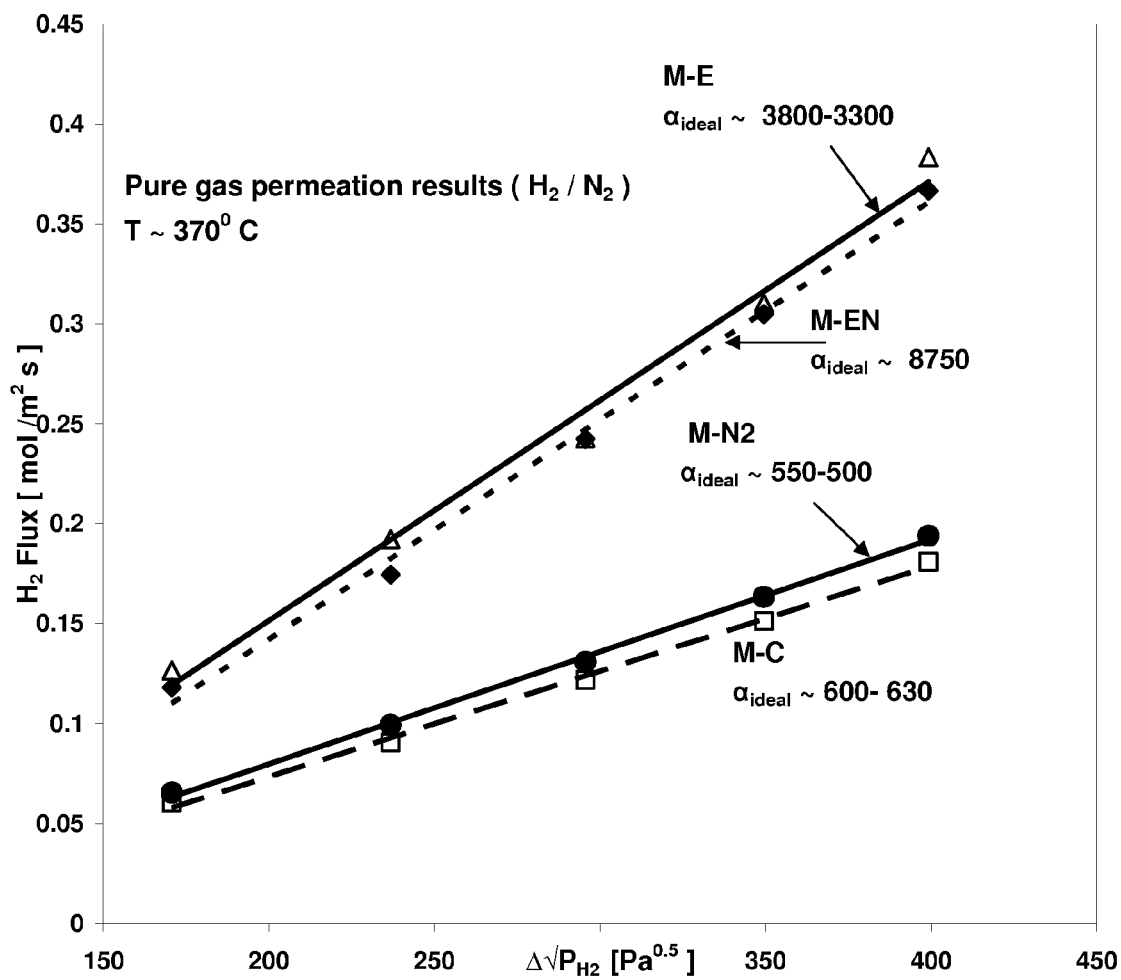
FIG. 11 shows typical results for the transmembrane $H_2$ flux and corresponding separation factors obtained during initial permeation experiments.

FIG. 11 shows typical results for the transmembrane $H_2$ flux and corresponding separation factors obtained during initial permeation experiments. The approximate thickness of each layer of material in the hollow fiber composite membrane is also shown in the plot. The $H_2$ flux was linear in $\Delta\sqrt{P_{H2}}$ (Sieverts' law) for all the membranes.

The results for the encapsulated Pd membranes showed that the separation factor for the Pd nanopore membrane (M-N) was ~9000 and for the Pd encapsulated membrane was ~3000 with $H_2$ fluxes in the range ~0.1-0.4 mol/(m²s). This combination of high flux and permselectivity is very rarely achieved by conventional types of Pd membranes. The Pd nanopore membrane exhibited a slightly lower $H_2$ flux than the conventional Pd membranes, but had a good separation factor. This can be attributed to the presence of Pd located above the sandwiched Pd layer which covered the defects in the base layer and hence aided in providing a higher separation factor. Even though the separation factor increase was more than double, the reduction in flux was much less. This can be attributed to the fact that the Pd was grown in a thin layer of $\gamma$-$Al_2O_3$ of thickness of 0.2-0.3 µm. The Pd contained in the nanopores did not offer a substantial diffusion resistance but was effective in repairing defects.

The Pd nanopore membrane exhibited a transmembrane $H_2$ flux of ~0.1 mol/(m² s) with a separation factor of 500. Here the reduction in separation factor can be due to the absence of a continuous base layer of Pd. The thickness of the $\gamma$-$Al_2O_3$ in which Pd was deposited was of the order of ~1 µm. The effective thickness of the Pd layer (or the path $H_2$ has to traverse) could be tortuous and could be greater than 1 µm. The reduction in the $H_2$ flux compared to other encapsulated variants was attributed to this reason. The encapsulated versions of the membrane were exposed to different and prolonged high temperature environments when compared to the Pd on $\gamma$-$Al_2O_3$ membrane. The Pd nanopore membrane (effective thickness ~1 µm) showed similar permselectivity characteristics as that of the $\gamma$-$Al_2O_3$/Pd membrane with 1 µm thickness.

Figure 12:
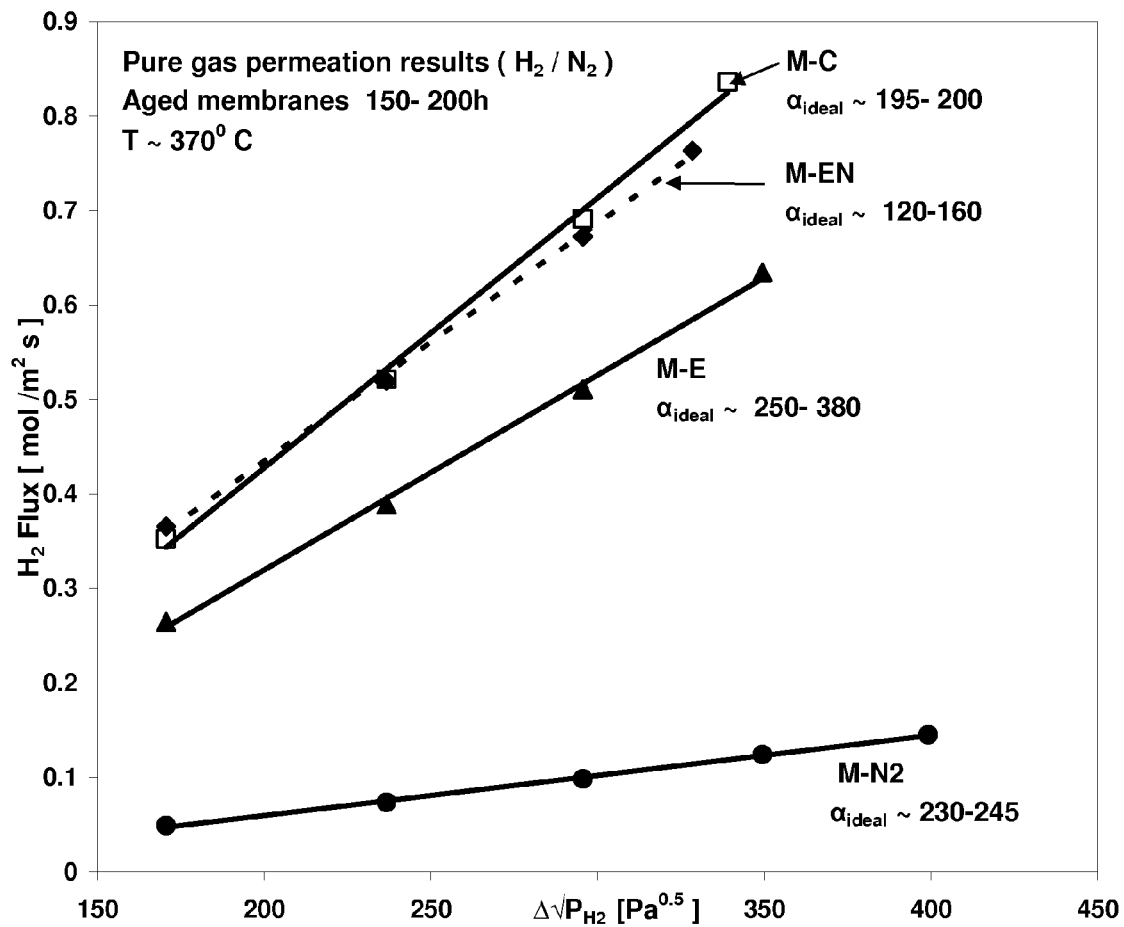
FIG. 12 shows the simulation results for elevated pressure, isothermal methanol reforming and methanol partial oxidation in a membrane reactor.

FIG. 12 shows the transmembrane $H_2$ flux characteristics and separation factors for aged membranes tested under constant temperature (370° C.) and pressure cycling conditions for a period of 120-200 hours of continuous operation. A very high permselectivity was achieved with encapsulated versions of Pd membranes. Separation factors were of the order of 100 are sustained after aging and the $H_2$ flux is very high—of the order of ~0.5-0.8 mol/(m²s). The flux and separation factor values for Pd nanopore membrane remain more or less constant with time on stream and pressure cycling. Experimental set up limitations prohibited the use a transmembrane pressure of 60 psi which was equivalent to a $\Delta\sqrt{PH_2}$~400 $Pa^{0.5}$ or a flux of ~1 mol/(m² s), and could have been achieved. This could be noticed by extrapolating the experimental data to 400 $Pa^{0.5}$.

Figure 13:
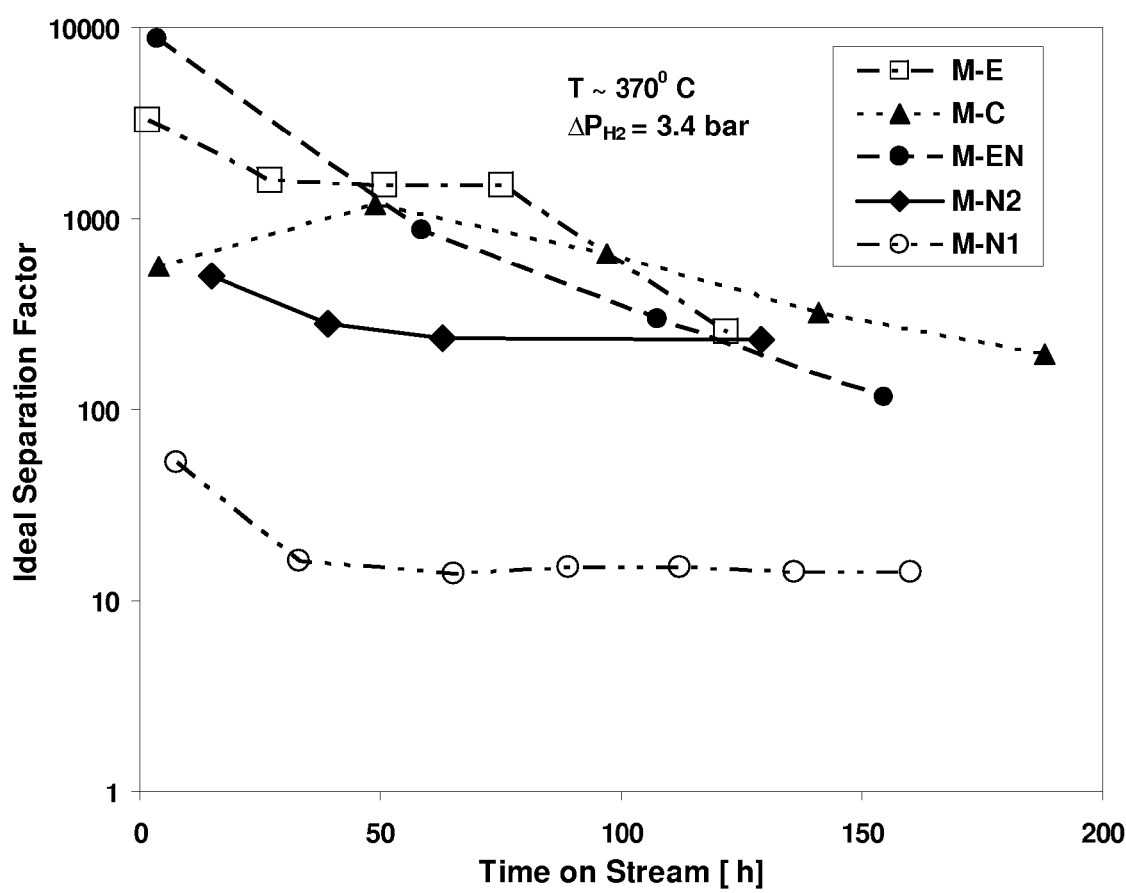
FIG. 13 shows the transmembrane $H_2$ flux characteristics and separation factors for aged membranes tested under constant temperature and pressure cycling conditions for a period of 120-200 hours of continuous operation.

FIG. 13 shows the variation of ideal separation factors with time on stream. After 100 hours of operation, separation factors for all the membranes stabilized to a value ~100. The Pd nanopore membrane exhibited significantly better stability compared to other type of membranes within the specified time period of operation. TABLE 3 shows the comparison of the results of the encapsulated membranes with other membranes published in literature. As shown by TABLE 3, the encapsulated versions of Pd nanopore membranes were superior to that of the conventional Pd based membranes in terms of permselectivity.

TABLE 3

Comparison of Published and New Data (in bold) on ELP protocols

| | Thickness [µm] | Driving Force $\Delta PH_2$[kPa] | $H_2$ Flux mol per (m² s) | Separation Factor | Permeance mol/(m2 s Pa0.5) | T[K] | Comments |
|---|---|---|---|---|---|---|---|
| $\gamma$-$Al_2O_3$/Pd/$\gamma$-$Al_2O_3$ | 1 | 400 | 0.38 | ~3500 | $9.5 \times 10^{-4}$ | 643 | Novel encapsulated membrane |
| $\gamma$-$Al_2O_3$/Pd/$\gamma$-$Al_2O_3$/Pd | 1 | 400 | 0.37 | ~8750 | $9.15 \times 10^{-4}$ | 643 | Novel encapsulated membrane |
| Pd nanopore membrane/ $\gamma$-$Al_2O_3$ | 1-2 | 400 | 0.19 | ~500 | | 643 | 1 µm thick $\gamma$-$Al_2O_3$ coated over Pd nuclei |
| $\gamma$-$Al_2O_3$/Pd/$\gamma$-$Al_2O_3$ | 1 | 350 | 0.63 | ~300 | $1.8 \times 10^{-3}$ | 643 | Novel encapsulated membrane (aged 120-200 hours) |
| $\gamma$-$Al_2O_3$/Pd/$\gamma$-$Al_2O_3$/Pd | 1 | 315 | 0.76 | ~130 | $2.3 \times 10^{-3}$ | 643 | Novel encapsulated membrane (aged 120-200 hours) |

TABLE 3-continued

Comparison of Published and New Data (in bold) on ELP protocols

| | Thickness [μm] | Driving Force ΔPH2[kPa] | H₂ Flux mol per (m² s) | Separation Factor | Permeance mol/(m2 s Pa0.5) | T[K] | Comments |
|---|---|---|---|---|---|---|---|
| Pd nanopore membrane/ γ-Al₂O₃ | 1-2 | 400 | 0.15 | ~240 | 3.75 × 10⁻⁴ | 643 | 1 μm thick γ-Al₂O₃ coated over Pd nuclei (aged 120-200 hours |
| Pd/SS | 6 | 100 | 0.06 | Not given | — | 673 | ELP |
| Pd/Al₂O₃ | 10 | 170 | 0.3 | 970 | — | 740 | ELP with Osmotic pressure method |
| Pd/Al₂O₃ | 10 | 100 | 0.09 | 1000 | — | 753 | ELP with Osmotic pressure method |
| Pd/Al₂O₃ | 11.4 | 689 | 0.71 | 650 | — | 823 | ELP |
| Pd/Al₂O₃ | 13 | 200 | 0.15 | Infinite | — | 673 | ELP |
| Pd/Al₂O₃ | 13 | 200 | 0.19 | Infinite | — | 773 | ELP |
| Pd/Al₂O₃ | 7-15 | 100 | 0.09-0.13 | 100-1000 | — | 673 | ELP |
| Pd/SS | 5 | 100 | 0.16 | 100-200 | — | 673 | ELP |
| Pd/SS | 19-28 | 100 | 0.02-0.05 | Upto 5000 | — | 623 | ELP |
| Pd—Ag/Al₂O₃ | 5.8 | 194 | 0.47 | Infinite | — | 673 | ELP |
| Pd—Ag/γ-Al₂O₃ | 7.5 | 100 | 0.0743 | 2550 | — | 673 | Johnson Matthey membranes |
| Pd—Ag/γ-Al₂O₃ | 7.5 | 300 | 0.145 | 2305 | — | 673 | " |
| Pd—Ag/γ-Al₂O₃ | 7.5 | 100 | 0.087 | 3280 | — | 773 | " |
| Pd—Ag/γ-Al₂O₃ | 7.5 | 300 | 0.17 | 3030 | — | 773 | " |
| Pd | 4 | 589 | 0.054 | | 1.69 × 10⁻⁴ | 673 | ELP with Osmosis |
| Pd | 8 | 589 | 0.052 | | 1.64 × 10⁻⁴ | 673 | ELP with Osmosis |

Membrane Technology Unique Features and Feasibility

The membranes of the invention were evaluated using the catalytic steam reforming, partial oxidation, or decomposition of liquid hydrocarbons or fuels. For example, to assess the feasibility of the Pd membrane fuel processor, the isothermal methanol reforming and methanol partial oxidation was simulated in a packed-bed membrane reactor containing Pd-coated hollow fiber membranes. Methanol is a good model fuel for reforming into hydrogen because the reaction can be carried out at moderate temperature and pressure. Three main reactions occur during methanol reforming on methanol synthesis catalyst (Cu/ZnO/Al₂O₃):

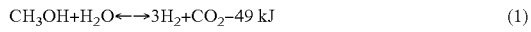
$$CH_3OH + H_2O \leftrightarrow 3H_2 + CO_2 - 49 \text{ kJ} \quad (1)$$

$$CO + H_2O \leftrightarrow H_2 + CO_2 + 41 \text{ kJ} \quad (2)$$

$$CH_3OH \leftrightarrow 2H_2 + CO - 90 \text{ kJ} \quad (3)$$

The reverse WGS (2) and methanol decomposition (3) lead to CO formation. Hydrogen can be consumed by reverse WGS and, to a lesser extent, methanol synthesis (reverse of reforming). Hydrogen also can inhibit the rate of steam reforming. For these reasons, selective recovery of hydrogen reduces CO levels and can increase the reforming rate. Its removal also produced a hydrogen stream with a high concentration, beneficial for fuel cell efficiency.

Figure 14:
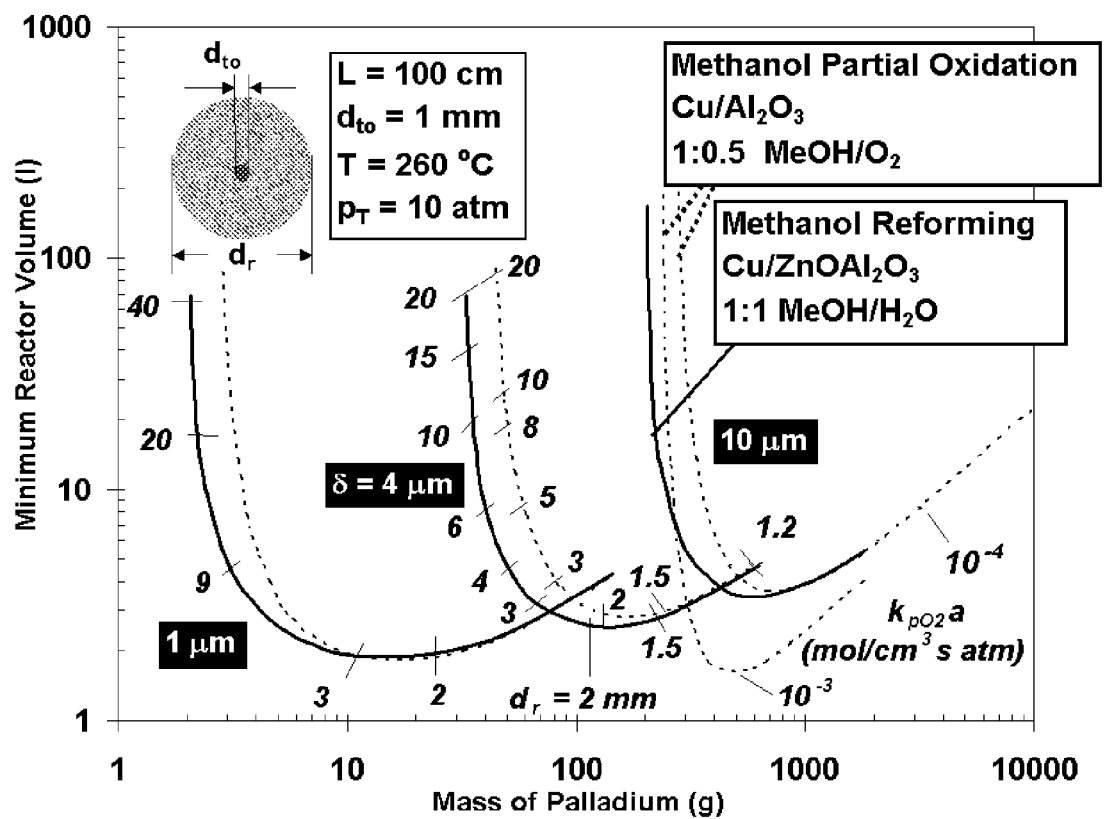
FIG. 14 is a graphical comparison of performance, ideal separation factor variation with time on stream for conventional, encapsulated and nanopore membranes. Membranes M-N1 and M-N2 show nearly constant selectivity after the initial drop and hence give the indication of their stability

A graph of the minimum processor volume needed to supply hydrogen for a 50 kW fuel cell, shown in FIG. 14, provides guidance about reactor volume and Pd requirements. Results are shown for methanol reforming on Cu/ZnO/Al₂O₃ and partial oxidation on Cu/Al₂O₃ for three Pd thicknesses (1, 4, 10 μm). The membrane surface to reactor volume varies as a parameter along each locus. The results show the importance of reducing Pd membrane thickness and the benefit of using a fiber support. For example, a methanol reforming processor with a 10 μm thick Pd membrane has a minimum volume (2.8 liters) at a catalyst bed to fiber diameter ratio, $d_r/d_{fi}$, of 2, and space velocity of 24,000 hr⁻¹, with 122 g Pd needed. On the other hand, only 10-20 g Pd is needed for the 1 μm Pd case. A fine fiber support (e.g. $d_{fo}$=1 mm) affords a higher surface to volume ratio, and therefore a smaller reactor can be used.

A significant advantage of the membrane reactor was the potential for smaller volume. Steady-state process simulations have been done that compare the conventional three-step fuel processor with membrane-based processors to estimate reactor volumes, to evaluate systems-level integration issues, and to estimate overall system efficiencies. Each system was optimized in terms of overall efficiency, with the reformer temperature, water:carbon ratio and oxygen:carbon ratio the main tuned parameters. Analysis revealed that the overall reactor volume can be reduced by a factor of 2 for methanol and a factor of 5 for tetra-decane in TABLE 4. Among other findings, the penalty incurred by operating the membrane reactor at higher pressure was more than offset by the in situ removal of hydrogen. These analyses indicated that Pd-based membranes were feasible in terms of productivity and efficiency, means to reduce the amount of Pd and to achieve robust membranes are critical.

TABLE 4

Reactor Volume and Efficiency requirements

| Case | LHV Efficiency | Reactor Volume, liters | | | |
|---|---|---|---|---|---|
| | | Reformer | WGS | PrOx | Total |
| (1) Methanol Steam Reformer w/ PrOx | 50.2% | 11.2 | 0 | 12.3 | 23.5 |
| (2) Methanol ATR w/ PrOx | 50.3% | 9.1 | 0 | 12.3 | 21.4 |

TABLE 4-continued

Reactor Volume and Efficiency requirements

| | LHV | Reactor Volume, liters | | | |
|---|---|---|---|---|---|
| Case | Efficiency | Reformer | WGS | PrOx | Total |
| (3) Methanol ATR Membrane Reactor | 48.8% | 13.1 | 0 | 0 | 13.1 |
| (4) Liquid HC ATR w/ WGS & PrOx | 39.7% | 4.7 | 6.5 | 12.3 | 23.5 |
| (5) Liquid HC ATR Pd Membrane Reactor | 40.7% | 4.3 | 0 | 0 | 4.3 |
| (6) Liquid HC ATR Ceramic Membrane Reactor | 37.9% | 17.3 | 0 | 0 | 17.3 |

While embodiments of the invention have been shown and described, modifications thereof can be made by one skilled in the art without departing from the spirit and teachings of the invention. The embodiments described and the examples provided herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

The discussion of a reference in the Description of the Related Art is not an admission that it is prior art to the invention, especially any reference that may have a publication date after the priority date of this application. The disclosures of all patents, patent applications, and publications cited herein are hereby incorporated herein by reference in their entirety, to the extent that they provide exemplary, procedural, or other details supplementary to those set forth herein.

What is claimed is:

1. A catalytic membrane comprising:
   one or more porous hollow substrates;
   a first porous layer coated on to said one or more porous hollow substrates;
   a first catalyst layer formed on said first porous layer, said first catalyst layer comprising a catalyst; and
   a second porous layer deposited on said first catalyst layer, wherein the pores of said second porous layer are filled with said catalyst.

2. The catalytic membrane of claim 1, further comprising a second catalyst layer deposited on said second porous layer, said second catalyst layer comprising said catalyst.

3. The catalytic membrane of claim 1 wherein said one or more porous hollow substrates are hollow fibers.

4. The catalytic membrane of claim 3 wherein said hollow fibers have outer diameters ranging from about 0.1 mm to about 5 mm.

5. The catalytic membrane of claim 1 wherein said one or more porous hollow substrates have pores with an average diameter ranging from about 50 nm to about 200 nm.

6. The catalytic membrane of claim 1 wherein said one or more hollow substrates comprise a ceramic material.

7. The catalytic membrane of claim 6 wherein said ceramic material comprises alumina, zirconia, silica, or combinations thereof.

8. The catalytic membrane of claim 7 wherein said ceramic material is $\alpha\text{-}Al_2O_3$.

9. The catalytic membrane of claim 1 wherein said first porous layer is coated on the inner surface of said one or more porous hollow substrates.

10. The catalytic membrane of claim 1 wherein said first porous layer comprises $\gamma\text{-}Al_2O_3$.

11. The catalytic membrane of claim 1 wherein said first porous layer comprises pores having an average diameter ranging from 5 nm to about 15 nm.

12. The catalytic membrane of claim 1 wherein said first porous layer has a thickness ranging from about 0.5 µm to about 10 µm.

13. The catalytic membrane of claim 1 wherein said catalyst comprises a transition metal.

14. The catalytic membrane of claim 1 wherein said catalyst comprises palladium (Pd), platinum (Pt), silver (Ag), copper (Cu), or combinations thereof.

15. The catalytic membrane of claim 1 wherein said first catalyst layer comprises a thickness ranging from about 0.5 µm to about 10 µm.

16. The catalytic membrane of claim 1 wherein said second porous layer comprises $\gamma\text{-}Al_2O_3$.

17. The catalytic membrane of claim 1 wherein said second porous layer comprises pores having an average diameter ranging from 5 nm to about 15 nm.

18. The catalytic membrane of claim 1 wherein said first porous layer and said second porous layer comprise an interconnected pore structure.

19. The catalytic membrane of claim 1 having a $H_2$ flux ranging from about 0.1 mol/(m²s) to about 0.4 mol/(m²s).

20. A method of forming a catalytic membrane comprising:
   a) coating one or more porous hollow substrates with a first porous layer;
   b) depositing a catalyst on the first porous layer to form a first catalyst layer;
   c) depositing a second porous layer to cover the first catalytic layer; and
   d) filling the pores of the second porous layer with the catalyst to form the catalytic membrane.

21. The method of claim 20 wherein (a) comprises slip casting the first porous layer on to the one or more porous hollow substrates.

22. The method of claim 21 wherein slip casting the first porous layer comprises slip casting the one or more porous hollow substrates in a boehmite sol.

23. The method of claim 20 wherein (a) comprises dip coating the one or more porous hollow substrates, drying the first porous layer, and calcining the first porous layer.

24. The method of claim 20 wherein (b) comprises depositing a catalyst on the first porous layer using electroless plating.

25. The method of claim 24 wherein electroless plating of the first porous layer comprises:
   seeding the first porous layer with a plurality of catalytic nuclei;
   contacting the first porous layer with an electroless plating solution, said electroless plating solution comprising a catalyst; and
   depositing the catalyst on the first porous layer to form the first catalyst layer.

26. The method of claim 20 wherein (c) comprises:
   contacting the first catalyst layer with a sol to form the second porous layer; and
   drying and calcining the second porous layer.

27. The method of claim 26 wherein the sol is a boehmite sol.

28. The method of claim 26 wherein (c) is repeated at least twice.

29. The method of claim 20 wherein the catalyst comprises palladium (Pd), platinum (Pt), gold (Au), silver (Ag), copper (Cu), or combinations thereof.

30. The method of claim 20 wherein (b) comprises seeding metal nuclei on to the first porous layer to form the first catalyst layer, and (c) comprises sol-gel slip casting to deposit the second porous layer on to the first catalyst layer.

31. The method of claim 20 wherein (d) comprises filling the pores of the second porous layer with the catalyst by electroless plating.

32. The method of claim 20 wherein (d) comprises electroless plating for a time period sufficient to form a second catalyst layer on the second porous layer.

* * * * *